March 2, 1937.  W. W. HAMILL  2,072,448
ROLLING MILL OF THE OVERHUNG TYPE
Filed Dec. 26, 1934  2 Sheets-Sheet 1

INVENTOR
BY William W. Hamill
William A. Davis
ATTORNEY

March 2, 1937. W. W. HAMILL 2,072,448
ROLLING MILL OF THE OVERHUNG TYPE
Filed Dec. 26, 1934 2 Sheets-Sheet 2
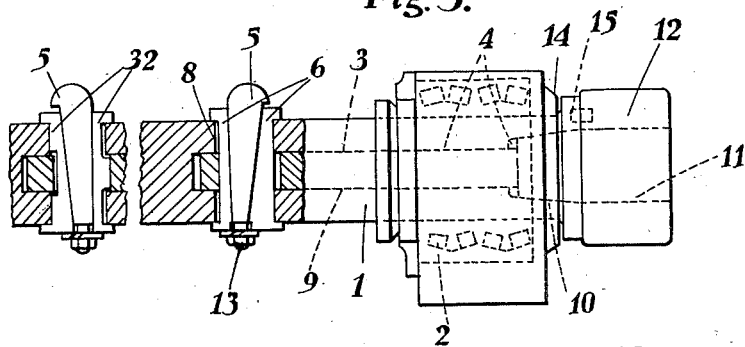
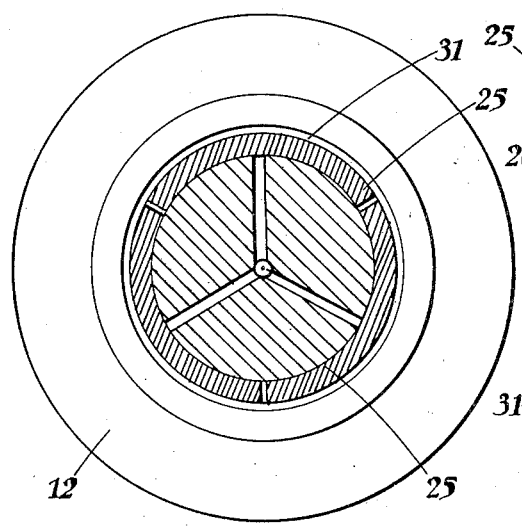
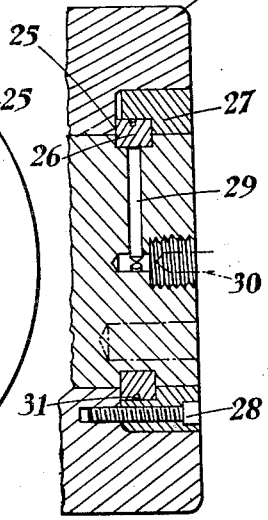
INVENTOR.
William W. Hamill
BY
William A. Davis.
ATTORNEY Patented Mar. 2, 1937

2,072,448

UNITED STATES PATENT OFFICE 2,072,448

ROLLING MILL OF THE OVERHUNG TYPE

William Wilson Hamill, Four Oaks, England

Application December 26, 1934, Serial No. 759,223
In Great Britain February 8, 1934

16 Claims. (Cl. 80—54)

This invention relates to rolling mills and is more particularly concerned with those of the overhung type in which the rolls project cantilever fashion from the side of the housing as distinguished from those arranged intermediate to and supported by and at both ends by the housing. Such overhung type of mill is very convenient and in some cases essential for certain classes of rolling processes but is subjected to very severe stresses particularly at the region where the roll is supported on or coupled to the driving shaft. The roll proper is detachably connected to the driving shaft and difficulties have been experienced in providing a satisfactory mode of connection.

The present invention is directed to an improved method of and means for detachably coupling the rolls proper to their respective driving shafts, by which the roll or rolls can be readily removed from or mounted on the driving shaft, and which avoids the expensive and early fractures or other breakdowns which characterize the hitherto known constructions.

The object of the invention is the provision of a support and connection which effects a reduction in the power required to turn the rolls when in operation, particularly when rolling work pieces; which enables the shafts to be of a permanent character; which will satisfactorily transmit the high torques involved; which gives continuity of working and freedom from breakdown; which provides a safeguard against excessive stresses; which includes shear means of comparatively inexpensive kind readily renewable or replaceable, capable of fracture in priority to the larger and more expensive parts, and adapted to constitute the before-mentioned safeguard; and which from the economic standpoint provides a better return for a given capital investment.

With the above and other objects in view as will appear in the following specification, the invention consists in a rolling mill of the overhung type having a two-part driving shaft comprising an outer driving shaft constructed for the transmission of torque, journalled permanently in the mill housings, and provided with a bore, and an inner roll-carrying shaft detachably inserted in the bore of the outer shaft and projecting from the end of said outer shaft to form a head on which the roll is carried.

By this construction, the main or primary outer and torque transmitting shaft can be fabricated from mild steel and dimensioned to provide rigidity and to operate at low values of stress since it is intended that said shaft shall remain permanently in situ in the housings; the overhanging insert secondary shaft can then be made of fatigue-resisting material such as one of the high-tensile alloy-steels and is thus better adapted to stand up to the heavy duty; if fracture does occur, the smaller and less expensive secondary shaft only is involved, and additionally, is capable of ready and convenient removal or replacement leaving the main shaft undisturbed in its housing.

In the drawings:

Figure 3 shows an assembly of the shafts and the means for locking them together.

Figure 4 is a fragmentary sectional view of another means for securing the roll endwise on the secondary shaft.

Figure 5 is an end view of Figure 4.

Figures 6, 7 and 8 are fragmentary views showing further means for endwise location of the roll.

Figure 1:
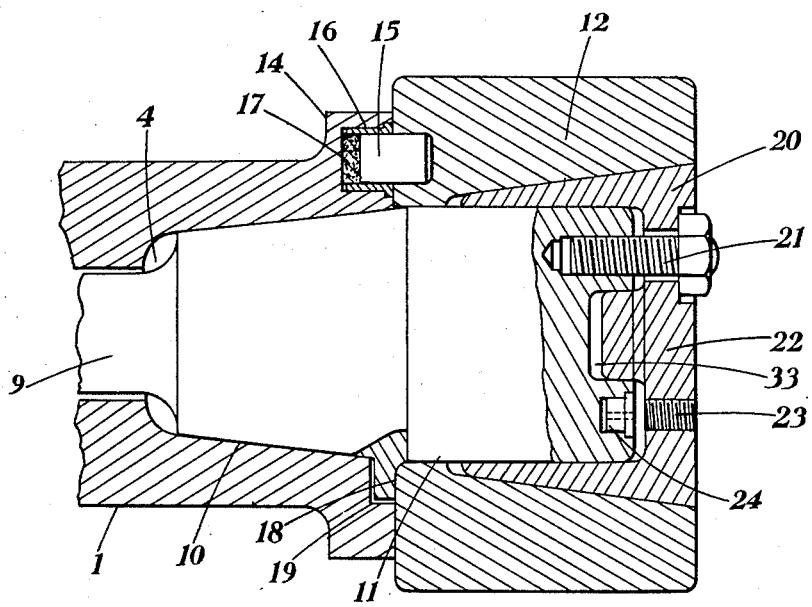
Figure 1 is a sectional elevation of the end portion of a rolling mill shaft according to the invention.
Figure 2:
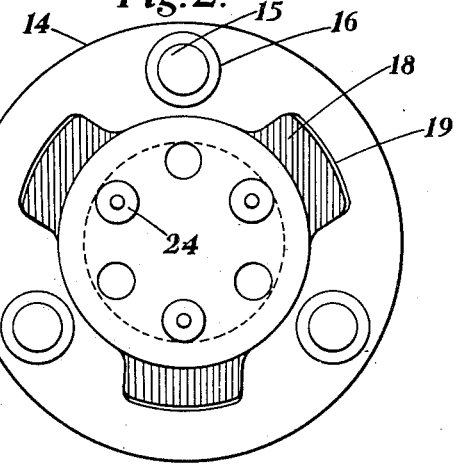
Figure 2 is an end elevation of Figure 1 with the roll removed, showing the outer end face of the primary shaft and of the secondary shaft.

In Figures 1 and 2, the main or primary driving shaft 1 is journalled in suitable housings (not shown) preferably in anti-fraction bearings denoted by 2, Figure 3, in order to reduce the power consumed in the rolling process, said bearings being preferably of the taper roller type. The reduction in power required is beneficial in that for a given diameter of shaft, there is a greater factor of safety, or alternatively the shaft can be reduced in diameter with a consequent saving in weight, initial cost, and maintenance cost. The primary shaft can be forged from usual quality soft mild steel and is of such dimensions that it is subjected to stresses, chiefly torsional, of a comparatively low order.

Engaged in a driving connection with the primary shaft is the secondary shaft 3 which it is preferred to embody as an insert shaft although I contemplate other modes of connection of the primary shaft and the secondary shaft. In the illustrations, the primary shaft 1 is provided with a boring 4 which extends from the end next the roll inwards to a suitable point intermediate the main bearings where it is intersected by a transverse slot 8 adapted to receive a cotter and gib fastening 5, 6 by which the secondary shaft is drawn into close engagement with the primary shaft.

The secondary shaft 3 comprises three integral parts: a stalk 9 housed within the bore 4 in the primary shaft; a taper neck 10 engaging in a self-locking connection with a conoidal bore in the primary shaft end; and a protruding head 11 on which the roll 12 proper is mounted. On this secondary or insert shaft are concentrated the major stresses of load and impact and it is therefore made of an alloy steel of high strength and resistance to fatigue, the projecting or overhung head being smaller than the diameter of the primary shaft but adequate to carry the bending stress peculiar to the duty. The stalk 9 functions as a tension member to prevent relative endwise movement of the two shafts, is free from torsional or bending stresses, and consequently may be of small diameter. Any suitable device may be employed for drawing together the tapered parts of the primary and secondary shafts advantageously taking the form of a tapered cotter 5 which coacts with gibs as previously mentioned and is furnished at the small end with a screwed shank, spring washer, and castellated nut 13. For separating the two shafts, the cotter and gibs are withdrawn and the cotter re-inserted in the reverse position (that is after displacement through 180°) together with a pair of reversed or withdrawing gibs 32, and driven in to apply compression to the secondary shaft and tension to the primary shaft, resulting in separation without damage and in a simple and expeditious manner.

To avoid the disabilities inherent in prior methods of transmitting power from the driving shaft to the roll, the driving torque is transmitted by means of a number of removable elements positioned at a large effective radius and constructed to be readily and inexpensively renewable; by incorporating separable elements, wear or breakage which may occur is confined to the comparatively inexpensive small parts, and the heavy and costly shafts and rolls are safeguarded; further the elements may be adapted to act as safety devices to break under excessive stresses and prevent them from being communicated to the shafts and rolls. In pursuance of these objects, the primary shaft is formed with a driving flange 14 on the outer face adjacent to the roll 12, and in the said flange are inserted a plurality of equally-spaced driving pins 15 arranged parallel to the shaft axis and extended to engage in a driving connection with the roll which abuts against the driving flange. For cheapness in manufacture, the cavities in the abutting face of the flange and the roll are circular, and the driving pins are made from round bar. As shown in Figure 3, the pins may be inserted directly in the cavities but in the preferred embodiment Figure 1 the effect of wear on the holes may be minimized by the introduction of hardened steel bushes 16 inserted in the shaft cavities, or alternatively the holes in both the shaft flange and the roll may be provided with bushes, though in the generality of cases it is sufficient to bush the shaft holes since the roll is subject to renewal at short periods on account of wear of the peripheral surface. To safeguard primarily the shaft and secondarily the roll, it is desirable to make the driving pins of soft and shearable metal which will fracture in preference to other parts and so avoid damage thereto in the event of excessive strains and stresses likely to be encountered in this kind of manufacturing process. With the driving pins may or may not be associated resilient pads 17 advantageously of rubber interposed between the end face of each pin and the floor of the relevant cavity either in the roll or in the shaft flange as illustrated. This soft and flexible backing to the driving pins prevents end movement of the pins in their holes and accommodates small variations due to manufacturing limitations; deformation space into which the rubber may be displaced is provided by arranging for the pads to be a loose fit in the holes, or by holes or recesses in the rubber, or otherwise. By separating the arrangements for torque transmission from those by which the roll is supported, the secondary shaft is freed from torsion stresses and therefore has a greater degree of reliability in service.

While the separate torque transmitting elements take the drive when the mill is operating in the normal manner, provision may be made by which the primary shaft is coupled directly to the secondary shaft in a rotary sense and arranged to prevent relative rotation of the two shafts in case of shearing of the driving pins. In such an event, twisting stresses are prevented from being transmitted to the cotter and gib fastening, and thereby damage to the two shafts is prevented. Such provision takes the form of segmental flange parts 18 integral with the secondary shaft and shaped to engage with matrix depressions 19 in the outer face of the primary shaft flange 14, with preferably a small amount of draft or lead to facilitate correct registering, and with very slight clearance at the driving faces to ensure firm seating of the taper neck 10.

Various ways of securing the roll endwise on the secondary shaft fall within the scope of the invention; two methods are illustrated, one including a conoidal member and the other embracing radially movable segments for co-operation with grooves. In the former, the truncated conoidal member 20 has a parallel bore which fits closely to the periphery of the secondary shaft head 11 on the one hand, and a taper periphery of self-locking angle such for example as 6°–7½° which fits into the mating bore of the roll on the other hand, the inner or driving end of the roll bore preferably being cylindrical and made to fit the periphery of the shaft head so as to centralize the roll when mounting. As the rolls are heavy, the operation of mounting the roll on the secondary shaft is considerably facilitated by this self-centering function. Rebated studs or setscrews 21 pass through the end flange 22 of the member 20 to engage with tapped holes in the shaft head 11 in a clamping action to press together the contacting end face of the roll and the outer face of the flange 14, separation being assisted by the provision of thrust screws inserted in tapped holes 23 in the said end flange 22 so that their inner ends abut against the adjacent end face of the shaft head 11, and draw the roll off the secondary shaft; hardened steel pads 24 may be let into the head 11 to take the wear.

Figures 4 and 5 illustrate an embodiment wherein an annular locking ring composed of segments 25 engages as to its inner part with a groove 26 cut in the periphery of the secondary shaft head 11 and as to its outer part with a groove in the bore of the roll or part associated therewith. In the illustration, the outer groove is formed by means of an L section ring 27 let into a rebate in the outer end face of the roll and secured by suitable screws 28. The locking ring being a close fit in the groove 26, it is desirable to incorporate means of release acting to force the segments radially outwards when the roll is to be removed, a simple form including radial plungers 29 positioned to operate at one end on the bore of the segments, and at the other arranged for radial movement by an axial motion of a common plunger 30 having an inclined end.

To facilitate assembly of the locking ring segments, an encircling wire ring 31 of small cross-section may be placed in a groove turned in the periphery of the segments.

Either mode of fixing may be used with a common secondary shaft according to the manner of working, the head of the shaft being provided with both the peripheral groove to receive the locking segments, and the tapped holes and cavities pertaining to the means illustrated in Figure 1, the central faucet 33 being dispensed with.

According to another construction of the segment method, provision is made whereby initial pressure is set up between the sides of the groove and the parts fitting therein so that no movement however slight shall occur between the fitting parts. Figure 6 shows such a construction wherein the segments are divided into sections 34 having inclined faces engaged by a triangular-section junk ring made in segments 35 movable radially outwards by radial plungers 29 under the effect of a common central axially-movable plunger similar to 30 Figure 4 but forced home and locked by a screw; such movement constrains the segments to press firmly and with considerable pressure against the sides of the groove 26.

In lieu of applying a separating movement to the junk ring by a member movable radially outwards, I may employ a member movable radially inwards such for example as illustrated in Figure 7 wherein 36 denotes the segments of a junk ring with inclined sides and sloping periphery 37 which latter is engaged by the bore of the groove ring 27, the slope whereof is made to correspond. By forcing the groove ring in an endwise direction, the separating junk ring is displaced radially inwards and its inclined sides force the segments of the locking ring against the sides of the groove.

A further development shown in Figure 8 includes a segmental locking ring 38 adapted to fit in a wedging action, the sides of the groove which for this purpose are inclined instead of parallel as in the other embodiments. The mouth of the end ring 39 is formed with a slight taper to co-act with the correspondingly-tapered periphery of the wedging ring 38 in manner similar to that illustrated in Figure 7. It will be apparent that when the ring 39 is pressed home in an endwise direction, the whole assembly is rigidly and firmly held together by the wedging action of the parts, and that initial movement which ultimately produces loosening, is inhibited. The mating inclined surfaces in this and the two preceding embodiments, may comprise a series of separately movable segments so as to accommodate the different curvature of conical surfaces when moved the one in relation to the other, or the number of segments may be increased with the like object.

To resist attritive action between the head of the secondary shaft and the bore of the roll and/or of the conoidal member, the contacting surfaces may be treated or adapted so as to present a hard surface; in one such method, the peripheral diameter of the said head part is slightly reduced and a hardened sleeve (of nitrided steel for instance) fitted tightly thereon. According to another construction, the hardened sleeve is used in conjunction with a hard or hardened surface on the reduced diameter; chromium for instance being deposited by electrolysis on to the secondary shaft head.

The operation of mounting a roll in position on the protruding stub of the shaft is very simple consisting of inserting the driving pins in the holes in the driving flange of the primary shaft; sliding the roll on to the stub shaft until the driving pins register with the holes in the roll (facilitated by the chamfered ends of the pins); placing the conoidal member on the stub shaft and moving endways until the taper surfaces meet, helped if desired by a pre-heating in oil of the member; clamping the assembly by the screws in the stub shaft, or relying on the drive-up of the conoidal member; and locking the screws by split pin, ring, or other means; or alternatively, placing the segmental locking ring into the stub shaft groove and completing the groove by the L-section ring. Removal of a roll is effected by performing the said sub-operations in a reversed sequence, preceded by the use of forcing screws or a claw type withdrawing tool with rolls incorporating the conoidal member.

Assembly or removal of the secondary shaft is also a very simple and expeditious operation should it be necessary consisting merely in sliding the secondary shaft into or out of the boring in the primary shaft, and the insertion or withdrawal as the case may be of the gib and cotter fastening. All the aforesaid sub-operations are simple and straightforward involving neither the use of tools difficult to operate nor special skill on the part of the workmen. It follows from the simple character of the sub-operations that a change of roll can be made in a time which does not interfere seriously with the working time of the mill and that thereby a useful contribution is made to the economic productivity of the machine. The considerable saving in power and lubricants during rolling operations which accrues by virtue of diminished friction loss, renders desirable the employment of roller bearings for supporting the primary shaft but since disturbance of such bearings for removal of the shaft involves careful and lengthy re-adjustment when re-assembling, and the moving of ponderous parts, the gain in power consumption is largely offset for the reasons indicated unless mounting and de-mounting the roll can be carried out quickly and conveniently such as by the means hereinbefore set forth. Not only is a quick change needed to realize the benefits outlined but the severe stresses inherent in the type of mill demand satisfactory and reliable driving and supporting means for the roll if delays and breakdown are to be avoided. Rolling mills constructed in accordance with the invention satisfactorily and economically meet the particularly arduous service and constitute an appreciable advance in the art.

While I have described the application of the invention to a single shaft, it will be apparent that in practice both rolls will be built in the manner indicated.

Having described my invention, what I claim is:

1. A rolling mill of the overhung type having a two-part driving shaft consisting of an outer and torque-transmitting shaft journalled permanently in the mill housings and provided with a bore; an inner roll-carrying shaft detachably inserted in the bore and projecting from the end of the said outer shaft; and means for transmitting the driving torque from the outer shaft directly to the roll to avoid subjecting the said insert shaft to said torque.

2. A rolling mill of the overhung type having a driving shaft comprising in combination a primary shaft journalled in the mill housings, a secondary roll-carrying shaft of fatigue-resisting alloy steel attached to the primary shaft, extending from one end thereof, and subjected to bending stresses but not to the driving torque; and means which transmit the driving torque directly from the primary shaft to the roll.

3. A rolling mill of the overhung type having a driving shaft comprising in combination a primary shaft journalled in the mill housings; a secondary shaft roll-carrying shaft of fatigue resisting alloy steel attached to the primary shaft; and means for connecting the said shafts including an axial cavity in the primary shaft, a stem on the secondary shaft, and means for detachably coupling the said stem and the said primary shaft; and means for transmitting the driving torque directly from the primary shaft to the roll.

4. In a rolling mill of the overhung type, a driving shaft comprising in combination a primary shaft journalled in the mill housings; a secondary roll-carrying shaft attached to the primary shaft; and means for detachably connecting the said shafts including an axial cavity in the primary shaft, a stem on the secondary shaft inserted in said axial cavity, a taper neck of self-locking angle adjacent the said stem, a taper bore in the proximate end of the primary shaft with which said taper neck engages, means for drawing together said tapered parts, a projecting end on the inserted secondary shaft for carrying the roll, and means for transmitting the driving torque directly from the primary shaft to the roll.

5. In a rolling mill of the overhung type, a driving shaft comprising in combination a primary shaft journalled in the mill housings; a secondary roll-carrying shaft attached to the primary shaft; means for detachably connecting the said shafts including an axial cavity in the primary shaft, a stem on the secondary shaft inserted in said axial cavity, a taper neck of self-locking angle on the secondary shaft adjacent said stem, a taper bore in the proximate end of the primary shaft with which said taper neck engages; means for drawing together and separating said tapered parts comprising transverse slots in the primary shaft, a transverse slot in the stem of the secondary shaft in the vicinity of the primary shaft slots, and a gib and cotter fastening located in said slots; and a projecting roll-carrying end on the secondary shaft.

6. In a rolling mill of the overhung type, a driving shaft comprising a primary shaft journalled in the mill housings, a secondary roll-carrying shaft attached to the primary shaft, means for transmitting torque from the primary shaft directly to the roll, and means for preventing relative rotary movement of the primary and the secondary shaft in case of failure of the said torque-transmitting means.

7. In a rolling mill of the overhung type, a driving shaft comprising a primary shaft journalled in the mill housings, a secondary roll-carrying shaft attached to the primary shaft, and means for transmitting torque directly from the primary shaft to the roll including a plurality of spaced driving elements engaging as to the one part with the adjacent end of the primary shaft and as to the other part with the roll.

8. In a rolling mill of the overhung type, a driving shaft comprising a primary shaft journalled in the mill housings, a secondary roll-carrying shaft attached to the primary shaft, and means for transmitting torque directly from the primary shaft to the roll including a plurality of spaced driving elements engaging as to the one part with the adjacent end of the primary shaft and as to the other part with the roll, said elements being constructed to operate as safety devices and fracture under excessive torque.

9. In a rolling mill of the overhung type, a driving shaft comprising a primary shaft journalled in the mill housings, a secondary roll-carrying shaft attached to the primary shaft, means for transmitting torque from the primary shaft directly to the roll, and means for transmitting torque from the primary shaft to the secondary shaft consisting of interengaging projections and recesses on the primary shaft and the secondary shaft.

10. In a rolling mill of the overhung type, a driving shaft comprising a primary shaft journalled in the mill housings, a secondary roll-carrying shaft attached to the primary shaft, and means for transmitting torque from the primary shaft to the roll including a plurality of spaced driving elements which engage as to one part with the adjacent end of the primary shaft and as to the other part with the roll, and resilient devices interposed between the ends of the driving elements and the recesses in which they are housed.

11. In a rolling mill of the overhung type, a driving shaft journalled in the mill housings, and provided at its outer end with a plurality of axially-directed cavities, a secondary shaft inserted in said driving shaft for carrying the roll, and means for transmitting torque directly from the primary shaft to the roll including a plurality of spaced driving elements which engage as to one part with said cavities in the adjacent end of the primary shaft and as to the other part with the roll, and wear resisting bushes inserted in said cavities to encircle said driving elements.

12. In a rolling mill of the overhung type having a two-part driving shaft consisting of an outer and torque-transmitting shaft journalled permanently in the mill housings and provided with a bore, and an inner roll-carrying shaft detachably inserted in said bore and projecting from the end of the said outer shaft, means for endwise fixing of the roll on the projecting end of the insert shaft including a taper bore to the roll, an annular U-section member having the bore of its annular part to fit the periphery of the projecting end of the insert shaft and the periphery of its annular part to fit the taper bore in the roll, and means operating on the connecting limb of the U-section member to engage the projecting end of the insert shaft and draw together the said taper parts.

13. In a rolling mill as claimed in claim 12, means for drawing the roll off the projecting end of the insert shaft.

14. In a rolling mill of the overhung type having a primary shaft journalled in the mill housings and a secondary roll-carrying shaft attached to and projecting from the end of the primary shaft, means for endwise fixing of the roll on the secondary shaft including a peripheral groove in the projecting end of the secondary shaft, a groove or recess in the bore of the roll, an insert ring in said recess and provided with a stepped bore, and annular segments positioned partly in said roll groove and partly in said stepped bore.

15. In a rolling mill as claimed in claim 14, means for displacing the annular segments radially into close-fitting contact with the step in the bore of the insert ring.

16. In a rolling mill as claimed in claim 14, a taper step in the bore of the insert ring and a taper periphery on the insert ring engaged by said taper bore.

WILLIAM WILSON HAMILL.